UNITED STATES PATENT OFFICE.

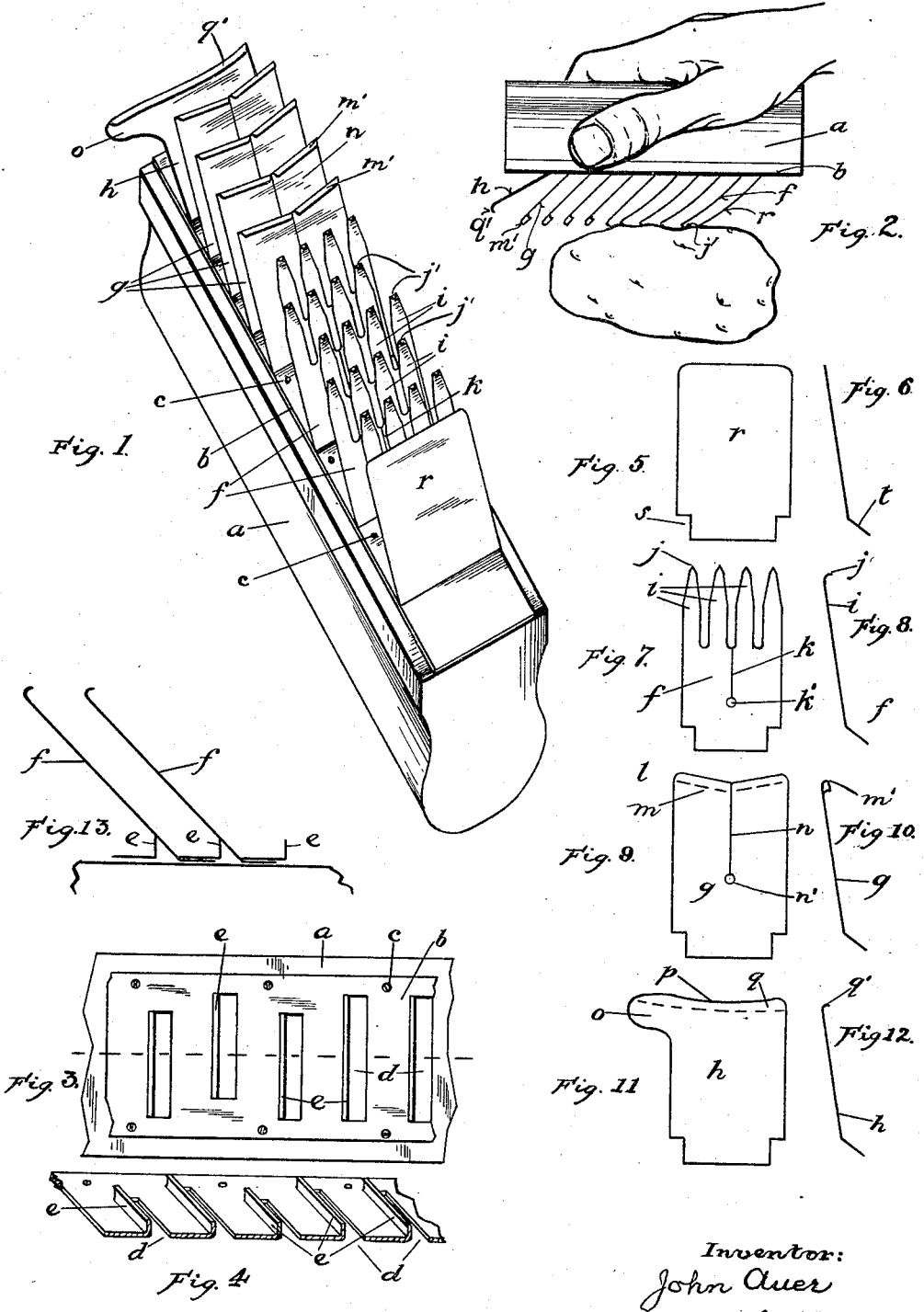

JOHN AUER, OF PORTLAND, OREGON.

FRUIT AND VEGETABLE PEELING BRUSH.

1,274,663.  Specification of Letters Patent. Patented Aug. 6, 1918.

Application filed May 31, 1918. Serial No. 237,640.

*To all whom it may concern:*

Be it known that I, JOHN AUER, a citizen of the United States, and a resident of the city of Portland, county of Multnomah, State of Oregon, have invented a certain new and useful Improvement in Fruit and Vegetable Peeling Brushes, of which the following is a specification.

The object of my invention is to provide a brush-like, simple and inexpensive implement for removing the skin or peel of fruit and vegetables, especially potatoes. It is further my object to so contrive my device that the same will perform its work very quickly and remove no more of the outer part of the vegetable, or fruit, with the skin than required to obtain a substantially clean surface.

I attain my object in a peeling brush comprising a handle or stock provided with a plurality of projecting, inclined, resilient members arranged in groups, the first group being adapted to scarify the skin, the second group to remove the skin by abrasion. I also preferably provide a resilient guard preceding the scarifying members so as to facilitate the peeling work by preventing the scarifying tips of the scarifying members taking such firm hold at the beginning of the stroke as to pull the vegetable out of the hand. And I also preferably provide a cavity-scraping member located rearward of the series or group of abrading members.

The details of construction of my device and its mode of use is illustrated in the accompanying drawings, in which:

Figure 1 is an inverted, perspective view of my peeling brush including all the features enumerated;

Fig. 2 shows the mode in which my peeling brush is to be used;

Fig. 3 is a partial top view of the handle of the brush and the plate thereof affixed by which the members are secured in place;

Fig. 4 is a fragmental, perspective of said plate;

Fig. 5 shows a blank of the guard member;

Fig. 6 is a side elevation of such guard member;

Fig. 7 is a blank of one of the scarifying members;

Fig. 8 is a side elevation of the latter;

Fig. 9 is a blank of one of the abrading members;

Fig. 10 is a side elevation of the latter;

Fig. 11 is a blank of the cavity scraping member;

Fig. 12 is a side elevation of the latter; and

Fig. 13 shows diagrammatically the manner in which the plate illustrated in Figs. 3 and 4 serves to securely fasten the members on the handle of the brush.

The handle or stock, $a$, may be made of wood. On it is secured a plate $b$, by screws $c$. The plate $b$ has slots $d$ punched out, the punched-out parts being up-turned in the form of a supporting flange $e$. The plate $b$ serves to fasten the device by which the scarifying, abrading and scraping actions are performed. These devices consist of a series of scarifying members $f$, a series of abrading members $g$, and a cavity-scraping member $h$. All of said members may be stamped out of sheet-metal.

The construction of the scarifying members is shown in Figs. 7 and 8. It comprises a main body part the extremity of which is formed into fingers $i$, the tips of which are pointed, as at $j$, and said tips being bent to form a projecting hook-like scarifying device, as $j'$. In order to assure that the fingers $i$ will have ample flexibility, I prefer to make the blank of the scarifying members $f$ with a longitudinal slit $k$, terminating in a hole $k'$ to prevent tearing of the member in action.

The construction of the abrading members is shown in Figs. 9 and 10. They comprise a blank the extremity of which is concaved, as at $l$, and such extremity is then bent on the line $m$ so as to provide an abrading projection, as $m'$. In order to insure sufficient resiliency to the extremities of the abrading members, they are also provided with a longitudinal slit $n$ the end of which terminates in a hole $n'$ to prevent tearing.

The cavity-scraping member $h$ is made as shown in Figs. 11 and 12. It has a lateral scraping projection $o$. Its extremity is concaved, as at $p$, and is bent at an angle on the line $q$, so as to provide a scraping projection $q'$.

The scraping member $h$ may be termed an "after cleaner" since its purpose is finally to go over the bad surfaces. For this reason this member is preferably made of stiffer metal, which also gives greater rigidity to the lateral scraping projection $o$, which is specially adapted for cleaning out deep cavities. Furthermore, the scraping member $h$ is shorter and spaced from the preceding scarifying members, as illustrated in Fig. 2 so as to permit the doing of the final surface cleaning work by this member alone.

I prefer to precede the scarifying members by a resilient guard plate $r$, the construction of which is shown in Figs. 5 and 6. Each of the blanks is made with shoulders $s$ in its lower part, and such lower part is bent at an angle approximately as shown by $t$ in Fig. 6. By this construction I cause the members, when fastened by the plate $p$ to the handle, $a$, to be rigidly held against the upturned flanges $e$ of the plate $b$, as illustrated diagrammatically in Fig. 13.

The cavity-scraping member $h$ is preferably made of heavier material so as to be stiffer than the other members.

I prefer to so arrange the scarifying members $f$ that the fingers of one thereof will be staggered with respect to those of another scarifying member, as shown in Fig. 1.

The manner in which my peeling brush is used is graphically described by Fig. 2.

As mentioned, the purpose of the guard plate $r$, which precedes the scarifying members, is to facilitate the work of my brush. It serves to prevent the scarifying tips $j'$ of the scarifying members penetrating too deeply into the skin of the vegetable, or, in other words, taking so strong a hold as to pull the vegetable out of the hand. Of course the force with which the brush is caused to bear on the vegetable also regulates the force with which said scarifying tips take hold, but said guard plate facilitates the stroke of the brush, and renders it easy, by helping the hand of the operator to bear lightly at the commencement of the stroke; while without the guard plate the operator inadvertently might bear down too hard at the beginning of the stroke.

The abrading members $g$ have their extremities made concave so as to conform more or less to the convex cross section of the potato, or other article being cleaned, and thereby increase the efficiency of my device; for by said construction a greater part of the abrading projections $m'$ is brought into work at one time.

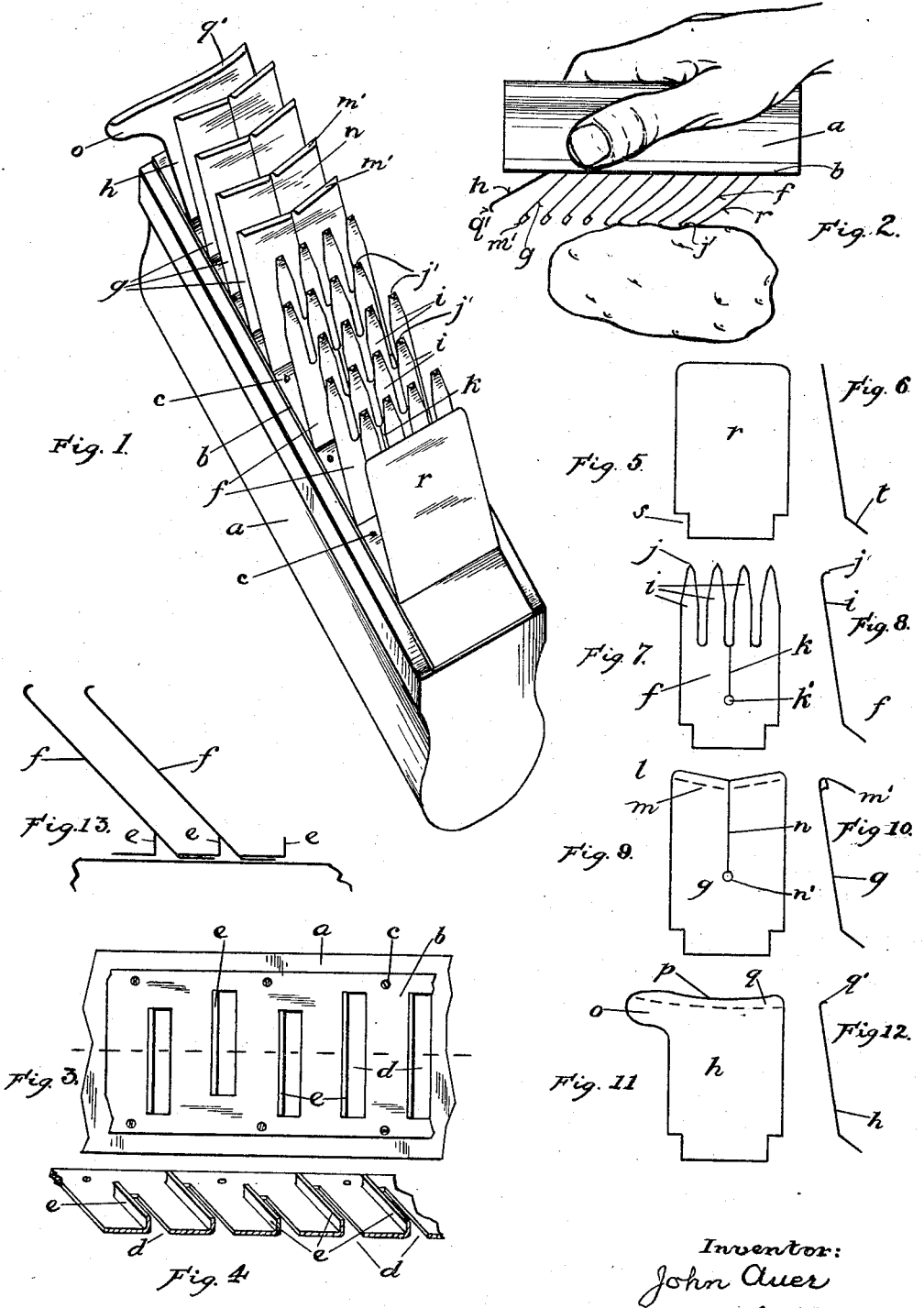

I claim:

1. A peeling brush comprising a handle provided with a plurality of projecting, inclined, resilient members adapted to scarify and abrade, and arranged in series, the scarifying members having their extremities formed into fingers the tips of which are provided with scarifying projections, a resilient guard preceding the scarifying members, the abrading members having a concaved extremity which is provided with abrading projections, and a cavity scraping member located rearward of the series of abrading members, its extremity being concaved and formed with a scraping projection, and being further provided with a lateral scraping projection.

2. A peeling brush comprising a handle provided with a plurality of projecting, inclined, resilient members adapted to scarify and abrade, and arranged in series, the scarifying members being slitted longitudinally and having their extremities formed into fingers the tips of which are provided with scarifying projections, a resilient guard preceding the scarifying members, the abrading members being also slitted longitudinally and having a concaved extremity which is provided with abrading projections, and a cavity scraping member located rearward of the series of the abrading members, its extremity being concaved and formed with a scraping projection and being further provided with a lateral scraping projection.

3. A peeling brush comprising a handle provided with a plurality of projecting, inclined, resilient members adapted to scarify and abrade, and arranged in series, the scarifying members being slitted longitudinally and having their extremities formed into fingers the tips of which are provided with scarifying projections, the fingers of one scarifying member being staggered with respect to those of the other, a resilient guard preceding the scarifying members, the abrading members being also slitted longitudinally and having a concaved extremity which is provided with abrading projections, and a cavity scraping member located rearward of the series of the abrading members, its extremity being concaved and formed with a scraping projection and being further provided with a lateral scraping projection.

4. A peeling brush comprising a handle provided with a plurality of projecting, inclined, resilient members adapted to scarify and abrade, and arranged in series, the scarifying members having their extremities formed into fingers the tips of which are provided with scarifying projections, and the fingers of one scarifying member being staggered with respect to those of the other.

5. A peeling brush comprising a handle provided with a plurality of projecting, inclined, resilient members adapted to scarify and abrade, and arranged in series, the scarifying members being slitted longitudinally and having their extremities formed into fingers the tips of which are provided with scarifying projections, and the fingers of one scarifying member being staggered with respect to those of the other.

6. A peeling brush comprising a handle provided with a plurality of projecting, inclined, resilient members adapted to scarify and abrade, and arranged in series, the scarifying members having their extremities